(12) United States Patent
Mennicken

(10) Patent No.: US 6,511,722 B1
(45) Date of Patent: Jan. 28, 2003

(54) SPACER

(76) Inventor: Willi Mennicken, Schweilbacher Strasse 29, Wurselen (DE), D-52146

(*) Notice: Subject to any disclaimer, the term of this patent is extended or adjusted under 35 U.S.C. 154(b) by 0 days.

(21) Appl. No.: 09/530,813

(22) PCT Filed: Nov. 5, 1998

(86) PCT No.: PCT/DE98/03231

§ 371 (c)(1),
(2), (4) Date: Jun. 29, 2000

(87) PCT Pub. No.: WO99/24330

PCT Pub. Date: May 20, 1999

(30) Foreign Application Priority Data

Nov. 5, 1997 (DE) .......................................... 197 48 788

(51) Int. Cl.$^7$ ................................................. B32B 1/02
(52) U.S. Cl. ...................... 428/34.1; 428/99; 248/206.2
(58) Field of Search ................ 428/99, 34.1; 248/206.2

(56) References Cited

U.S. PATENT DOCUMENTS 5,110,078 A * 5/1992 Gary ........................ 248/206.2

* cited by examiner

Primary Examiner—Alexander S. Thomas
Assistant Examiner—Jane Rhee
(74) Attorney, Agent, or Firm—David C. Purdue; John C. Purdue

(57) ABSTRACT

The invention proposes a spacer (1) for arranging between at least partially equidistant surfaces of components which are to be arranged temporarily adjacent to one another, in particular between plate-like or panel-like components, said spacer comprising solely an elastically deformable adhering element (3; 11; 14) and a supporting element (2) with two end surfaces, it being the case that the supporting element (2) is formed in a dimensionally stable manner from plastic and has a depression (5) on one side, it being the case that the adhering element (3; 11; 14) is secured in the depression (5) of the supporting element (2), projects beyond the depression (5) once relieved of stressing and, when subjected to compressive loading, can be forced back into the depression (5), and it being the case that the adhering element (3; 11; 14) and the depression (5) are coordinated with one another such that the adhering element (3; 11; 14) still maintains its elasticity in the position in which it has been forced back fully into the depression.

4 Claims, 2 Drawing Sheets

Figure 3:
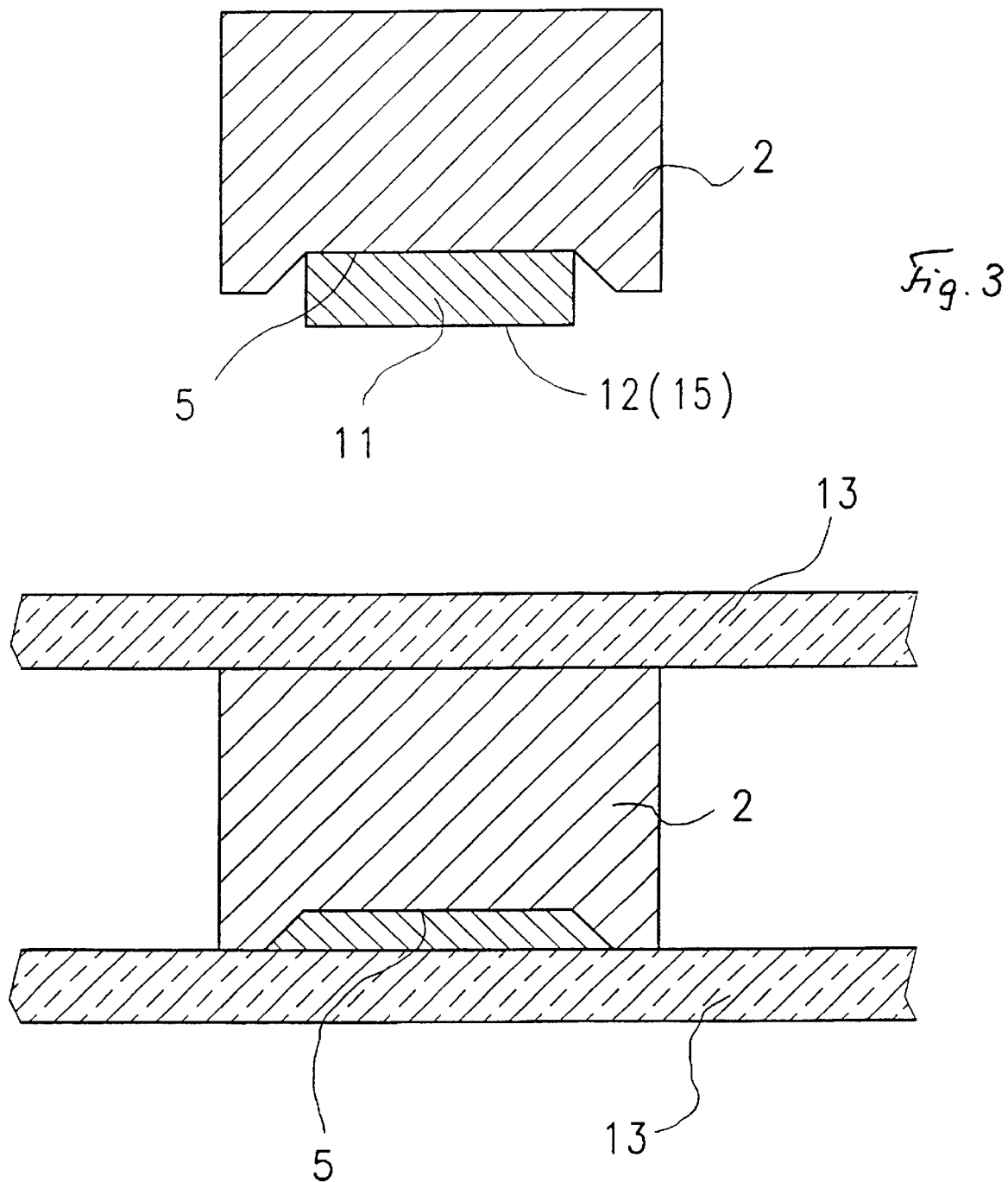

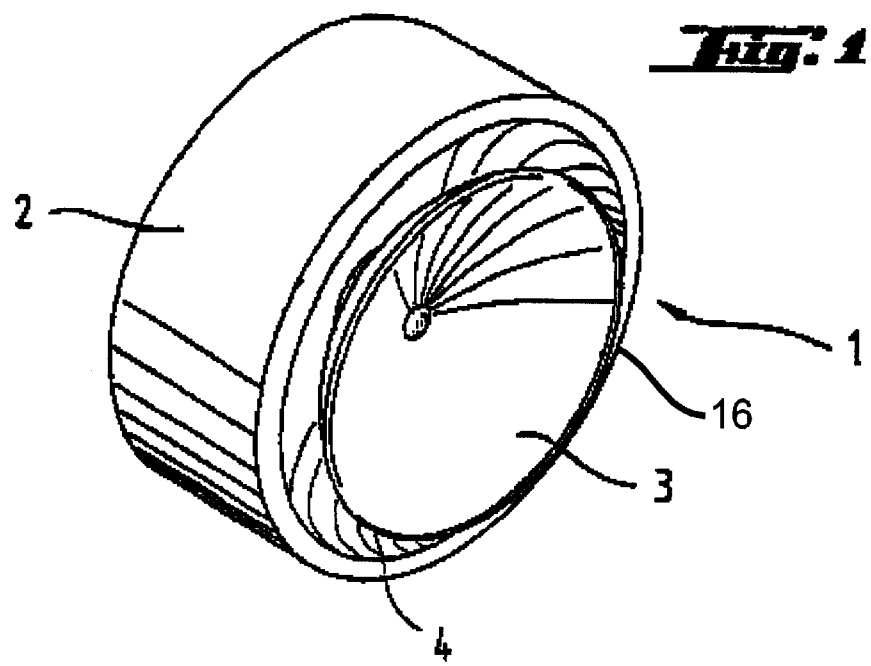
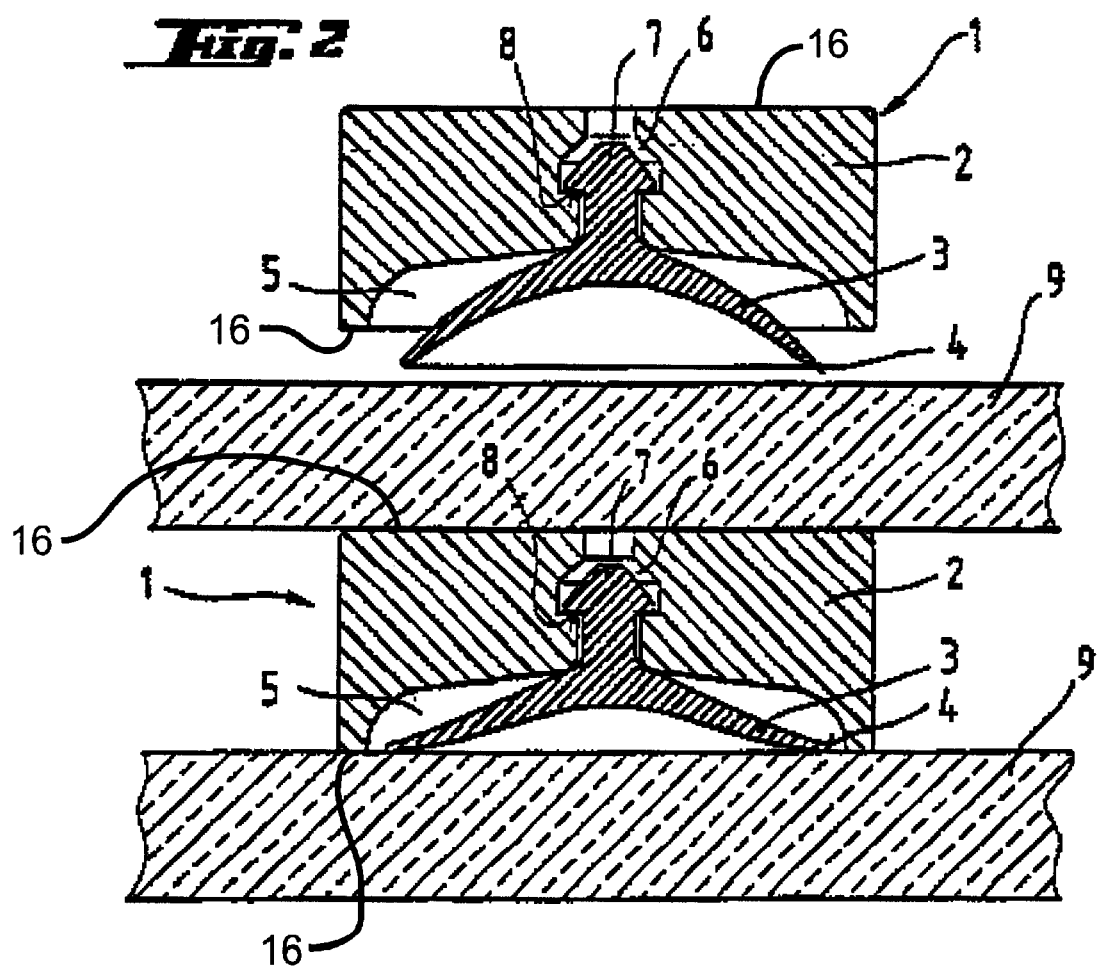

SPACER

DESCRIPTION

It is often problematic for components to be stacked, or positioned essentially vertically against one another, with at least partially equidistant surfaces for transportation or intermediate storage purposes. It has to be ensured here that the weight of the components or dynamic loading does not result in any undesired deformation to the components which may basically also result in damage.

DE 34 42 970 C2 deals with such problems occurring in this respect in the case of plates of glass. This document describes a strip-like intermediate layer which is intended for fastening on an outer plate of glass of a plate stack and can be secured on a smooth plate surface by means of elastic suction cups. Because the is intermediate layer has a comparatively large surface area—up to 3.2 m in length with a width of from 60 to 100 mm and a thickness of from 10 to 40 mm—use is made here. in particular, of Styropor foam strips which are covered with kraft paper on both sides. Suction cups are then secured on said intermediate layer. On account of the low stability of the material of the intermediate layer, each suction cup is assigned a steadying element in the manner of a snap-fastener connection. said connection of the suction cup and steadying element passing through the intermediate layer.

In order to function, the known spacer thus requires an intermediate layer, a suction cup and a steadying element, that is to say for such a mass-produced article it requires very high production outlay.

The present invention, then, has the object of forming a spacer for arranging between at least partially equidistant surfaces of components which are to be arranged temporarily adjacent to one another, in particular between plate-like or panel-like components, such that it reliably adheres, absorbs in a definable manner the loads which arise and can be reused.

This object is achieved in the case of a spacer according to claim 1.

According to the invention, the spacer comprises merely two elements, of which one element, the adhering element, is responsible for precisely maintaining the defined position, but not for applying the necessary supporting forces, while the other element, the supporting element, absorbs the supporting forces in a precisely defined manner. It is possible for the spacer to be provided with an adhering element on its two end surfaces in each case, in order thus to achieve adherence to each of the components abutting on both sides.

The spacer according to the invention may be designed such that the adhering element and the supporting element are adapted to the contour of the abutting component. This is expedient, in particular, for stacking curved components.

The spacer according to the invention may be designed such that the cross section of the supporting element is adapted to the contour of a receiving means of the abutting component. In this case, the spacer engages in the receiving means and thus secures particularly reliably the desired placing of the components in relation to one another.

The spacer according to the invention may be designed such that the supporting element and adhering element(s) are produced as a single-piece plastic injection moulding. This makes it possible in many cases for the production of the spacer to be rendered much less expensive.

The adhering element may be connected to the supporting element in any desired manner. All that is important is for the adhering element and supporting element always to be arranged in a defined manner in relation to one another.

The spacer according to the invention may be designed such that the adhering element is a suction cup which is open in the outward direction. In this case, the suction cup may be of any conventional configuration. It is possible for the suction cup adhering element and supporting element to be produced from the same material and for the differing functions to be determined by the configuration, e.g. the wall thicknesses. Furthermore, it is also possible for the material used for the suction cup to be, for example, rubber, PVC, silicone or the like and for the material used for the supporting element to be a more rigid material, e.g. a polyethylene, polyamide or polyurethane. It is expedient to use materials, for the supporting element and adhering element, which are related in such a way that they do not have to be separated from one another during subsequent recycling.

The adhering element may be fixedly connected to the supporting element in any known manner.

A further proposal of the invention provides that the suction cup is connected releasably to the supporting element. This version is suitable, in particular, for the use of different materials which cannot readily be made integral with one another. Moreover, it has the advantage that, when very different materials are used for the adhering element and supporting element, these materials can readily be separated for recycling. Furthermore, this proposal has the advantage that an exchange can be carried out if an element is damaged.

The spacer according to the invention may also be designed such that the suction cup has a fastening extension integrally formed on it, said extension projecting centrally from the side located opposite the cup side and engaging in a form-fitting manner in a hole of the supporting element.

The spacer according to the invention may also be designed such that the adhering element is formed by a flat part made of plastic which is self-adhesive on its outer surface. This embodiment results in a low overall height and, accordingly, makes it possible to maintain small spacings between adjacent components.

The advantage of a low overall height is also achieved in particular, when the adhering element is formed by a flat part made of shaped plastic, the part being provided on the outside with an adhesive which allows repeated adherence to, and detachment from, a component.

The spacer according to the invention may also be designed such that the adhering element comprises a flat part made of foamed plastic, of which the cells are open in the outward direction on one side in the region of the outer surface. This gives micro-sized suction cups with the advantages of low overall height with likewise reliable adherence.

In all forms, the spacer according to the invention has the advantage that it can be reused, that is to say it results in considerable savings in terms of materials used.

Embodiments of the spacer according to the invention are described in the following part of the description with reference to drawings, in which:

FIG. 1 shows a perspective illustration of one embodiment of the spacer according to the invention with a suction cup, FIG. 2 shows two sectional illustrations of the spacer according to FIG. 1, one in the non-loaded state before being placed on a plate of glass and one in the loaded state following insertion between two plates of glass, and FIG. 3 shows two sectional illustrations relating to further embodiments of the spacer according to the invention, one in the non-loaded state before being placed on a plate of glass, and one in the loaded state following insertion between two plates of glass.

According to FIG. 1, a spacer 1 comprises a cylindrical supporting element 2 in plate form and an adhering element which is fixedly connected thereto, albeit in a releasable manner, and is in the form of a suction cup 3 with a border-side sealing lip 4. The external diameter of the suction cup 3 is smaller than that of the supporting element 2. The outline of the spacer is unimportant. It may be, in particular round or polygonal.

The sectional view according to FIG. 2, in particular, shows the construction of the spacer 1. A depression 5 is provided in one of the end sides of the supporting element 2. The clearance of said depression is dimensioned such that the suction cup 3, in a partially compressed state, can be sunken therein to the full extent. In particular, the internal diameter of the depression 5 is slightly larger than the external diameter of the sealing lip 4. Provided centrally on the base of the depression 5 is an undercut hole 6 which may be formed as a blind hole or else, as shown here, as a through-bore. Introduced into said hole 6 is a fastening extension 7 which belongs to the suction cup 3, projects from the side located opposite the cup side and, for its part, comprises, in a manner known per se, an essentially cylindrical shank and an annular shoulder 8 provided above the latter.

The fastening extension 7 is preferably produced integrally from the same material as the suction cup 3. The annular shoulder 8 is snapped into the undercut of the hole 6. The suction cup 3 is thus latched in a form-fitting manner to the supporting element 2.

One can separate the suction cup 3 from the supporting element 2 by applying increased force. The release force necessary for this purpose has to be greater than the lift-off force by which the entire spacer 1 can be separated from a smooth underlying surface. If the hole 6 is formed as a through-hole, then it is possible for the suction cup 3 to be forced out of the depression 5 from its rear side, without being destroyed, by a suitable stick-like tool. This releasable connection aids the exchange of a defective suction cup 3 and, finally, the separation of materials during recycling of the two different materials of the spacer 1.

The bottom part of FIG. 2 shows how the suction cup 3 is sunken fully into the depression 5 following the insertion of the spacer 1 between two plates of glass 9. A small volume of air is still enclosed between the cut side and the bottom plate of glass 9, while the outer border of the depression 5 is seated on the bottom plate of glass 9 and the top plate of glass 9 is supported on the top side of the spacer and/or of the supporting element 2 at the desired or necessary spacing. The suction cup 3 is thus fully relieved of all the supporting forces and is thus reliably protected against overloading. Once it has been placed on a plate of glass 9, the spacer 1 may also be positioned on the surface without being detached again. In this case, the suction cup 3 and/or the sealing lip 4 thereof may temporarily come into contact with the inside of the depression 5 and is carried along by the latter.

In the rest state, which can be seen in the top part of FIG. 2, the sealing lip 4 of the suction cup 3 projects axially only insignificantly beyond the end border of the depression 5, whereas in the radial direction it juts back in relation to said border.

The height of the spacer 1 is determined by the requirements to be met by the spacings which are to be maintained between the plates of glass 9. A lower height boundary is attained from the height of the suction cup 3 along with the fastening extension 7. The thickness of the supporting element 2 may be reduced to such an extent that the free end surface of the fastening extension 7 introduced fully into the hole 6 is just in alignment with the top side of the supporting element 2, with the result that the effective height of the resulting spacer is essentially equal to the height of the non-loaded suction cup 3.

The embodiment according to FIG. 3 provides a supporting element 2 which likewise has a depression 5 on one end surface. A flat part 11 made of elastically compressible plastic is provided in this depression and fastened on the base of the depression. Once the part 11 has been relieved of stressing, it projects beyond the bottom end surface of the supporting element 2.

On its outer surface 12 the part 11 is coated with an adhesive by means of which it is possible to reduce repeatedly a releasable connection to an abutment surface of a workpiece 13 which is to be supported.

It is alternately provided that use is made of a part 14 made of an open-cell plastic. The cells located in the outer surface 15 thereof are open in the outward direction on one side and, when pressed against the abutment surface of a workpiece 13, act like small suction cups. During the action of pressing against an abutment surface, the spacer thus adheres to said surface. The bottom of FIG. 3 clearly shows that, when subjected to loading, the part is forced fully into the depression, the height of the depression ensuring that squeezing does not occur in this case, with the result that the ability of the part to be restored elastically once it has been relieved of loading is maintained in full.

In contrast to the figures, it is possible for the supporting element to have cutouts which, on the one hand, reduce the material consumption and, on the other hand, serve specifically for setting the rigidity and/or elastic compliance and damping ability of the supporting. It is also possible for these cutouts to be formed in the abutment surface remote from the suction cup.

The dimensional accuracy of the suction cup and/or of the parts and of the supporting element is not subject to any particular requirements, so that these parts may be produced inexpensively in large numbers.

It will be appreciated that, in its essential details, the invention is a spacer 1 (FIGS. 1 and 2) comprising a supporting element 2 and a suction cup 3 having a sealing lip 4. The supporting element has opposed positioning surfaces 16, 16 which are operable when the spacer is disposed between articles 9 that are to be spaced with surfaces of the articles in contact with the opposed positioning surfaces 16, 16 to position the articles in a predetermined spatial relationship relative to one another. The suction cup is received in a recess 5 in the supporting element which is at least partially surrounded by one of the opposed positioning surfaces 16, 16, and is releasably supported in the recess in a position where, when it is not stressed, its sealing lip 4 extends outside the recess as shown in the upper portion of FIG. 2. However, when the suction cup is subjected to axial compression, it is deformed to such an extent that it is wholly received within the recess, as shown in the lower portion of FIG. 2. The spacer 2 is so configured that, as the one of its positioning surfaces 16 which surrounds the recess 5 is moved toward contact with a surface of an article 9, which is one of two articles to be spaced, the sealing lip 4 of the suction cup contacts the surface of the article 9 and the suction cup 3 is thereafter compressed axially as the positioning surface continues to move toward contact with the surface of the article 9 so that, as shown in the lower portion of FIG. 2, it is wholly within the recess when the positioning surface 16 contacts the surface of the article 9. Preferably, as shown in FIG. 1, the positioning surfaces 16 of the supporting element 2 have contours which match that of the article surfaces they contact when the spacer is in use. Most desirably, the positioning surfaces 16 of the supporting element 2 are substantially planar and parallel so that two sheets of glass or the like which are positioned by contact with the positioning surfaces are substantially parallel with one another.

What is claimed is:

1. A spacer comprising a supporting element and a suction cup having a sealing lip, said supporting element having opposed positioning surfaces which are operable when the spacer is disposed between articles that are to be spaced with surfaces of the articles in contact with the opposed positioning surfaces to position the articles in a predetermined spatial relationship relative to one another, said suction cup being received in a recess in said supporting element which is at least partially surrounded by one of the opposed positioning surfaces, and being releasably supported in the recess in a position where, when it is not stressed, its sealing lip extends outside the recess, but said suction cup being one which, when subjected to axial compression, is wholly received within the recess, the spacer being so configured that, as one of its positioning surfaces is moved toward contact with a surface of one of two articles to be spaced, the sealing lip of said suction cup contacts the surface of the article and said suction cup is thereafter compressed axially as the positioning surface continues to move toward contact with the surface so that it is wholly within the recess when the positioning surface contacts the surface of the article.

2. A spacer as claimed in claim 1, characterized in that the positioning surfaces of said supporting element have contours which match that of the article surfaces they contact when the spacer is in use.

3. A spacer as claimed in claim 2, characterized in that the positioning surfaces of said supporting element are substantially planar and parallel so that two sheets of glass or the like which are positioned by contact with the positioning surfaces are substantially parallel with one another.

4. A spacer as claimed in claim 1, characterized in that said suction cup comprises a fastening extension with a projecting annular shoulder, and said supporting element has a hole with an undercut, wherein said suction cup is retained in the recess by releasable engagement between said annular shoulder and said undercut.

* * * * *